UNITED STATES PATENT OFFICE.

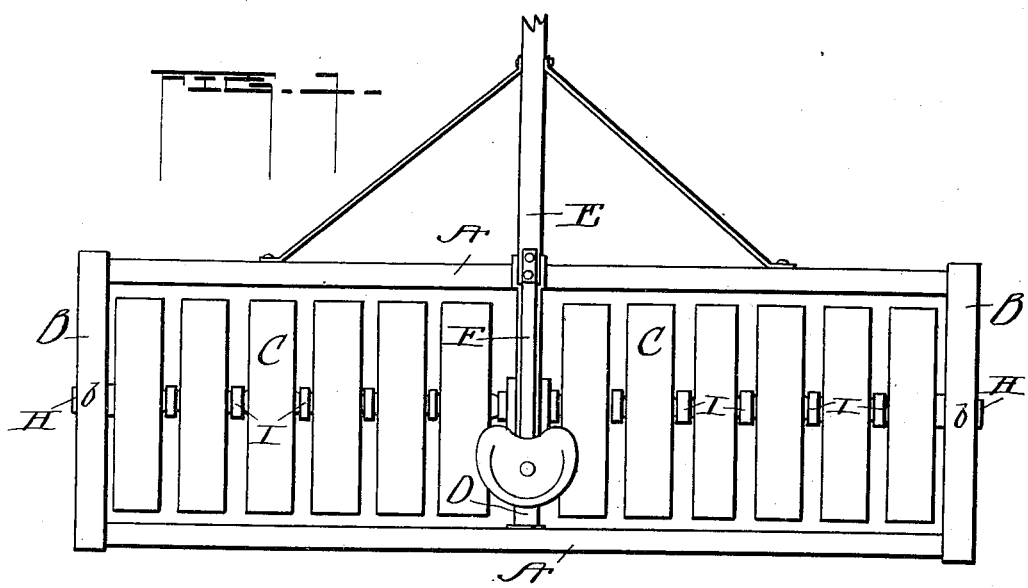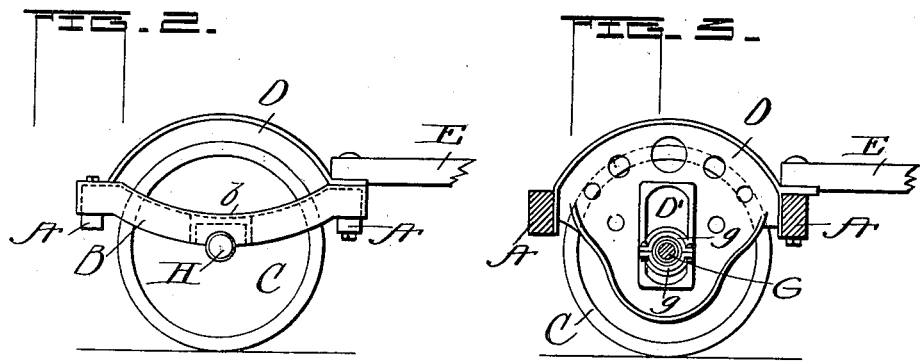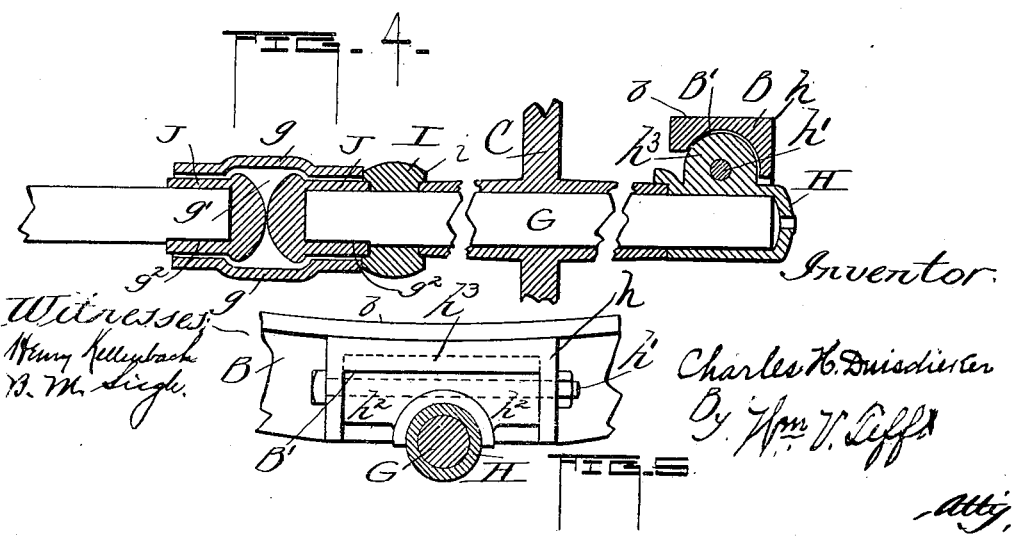

CHARLES H. DUISDIEKER, OF PEKIN, ILLINOIS.

PULVERIZER.

SPECIFICATION forming part of Letters Patent No. 658,430, dated September 25, 1900.

Application filed April 18, 1900. Serial No. 13,389. (No model.)

*To all whom it may concern:*

Be it known that I, CHARLES H. DUISDIEKER, a citizen of the United States, residing at Pekin, in the county of Tazewell and State of Illinois, have invented certain new and useful Improvements in Pulverizers; and I do hereby declare that the following is a full, clear, and exact description of the invention, which will enable others skilled in the art to which it appertains to make and use the same.

My invention has reference to pulverizers, and especially does it relate to that class of pulverizers that crush the clods or loosen the surface of the soil to better prepare it to receive the seed.

More particularly does my invention relate to a pulverizer consisting of a suitable supporting-frame arranged to have journaled therein one or more longitudinally-arranged shafts or axles having flexible bearings to allow of vertical movements at their inner bearing ends and arranged to carry suitable spur or pulverizing wheels separated on said shafts by suitable sand boxings or collars, the arrangement of the wheels and axle being such with relation to the frame that any vertical movement or rotation of the shaft or shafts will have no material effect on the bearing-frame, which has a rigid bearing relation thereto, or to such movement of the shaft.

The object of the invention, as will be hereinafter set forth in detail, is to so construct a pulverizer that a rigid supporting-frame may be provided, which has suitably journaled therein one or more shafts, preferably two, having a vertical bearing relation at their inner ends within the frame and journaled at their outer ends within the frame in boxings having a partial rotatable or swinging movement therein. This is an important feature of my invention, as it increases the efficiency of a pulverizer of this character, owing to the provision of the boxings or journals being such as to provide in reality shafts which have a flexible bearing relation in the frame, enabling the wheels through the shaft or shafts to adapt themselves to ruts or obstructions with perfect ease and to readily readjust themselves to their normal positions.

That my invention may be more fully understood reference is had to the accompanying drawings, in which—

Figure 1 is a ground plan view of my device. Fig. 2 is an end view from one side. Fig. 3 is a cross-section in elevation to show the center frame support and bearing. Fig. 4 is an enlarged longitudinal broken section showing the shaft or axle and center and outer bearings for one side. Fig. 5 is a detail view, enlarged, of the outer bearings.

In the drawings like letters of reference indicate the several corresponding parts of the figures.

A rectangular bearing or supporting frame is provided for said pulverizer, consisting of the parallel frame supports or beams A A, connected at opposite ends by the angular frame parts B B, having the centrally-depressed portions $b$.

D is a central bearing-frame part, of suitable size and shape, to which the frame parts A A are suitably attached at their central body portions. The same is provided with the centrally-disposed rectangular opening D', having curved upper and lower inclosing portions, as shown.

G is a shaft made perfectly of two parts, as shown, having a longitudinal bearing relation in the frame, the same being coupled at its outer ends in the boxings H, which have a pivotal bearing relation in the frame parts B for a purpose to be further described. The boxings H are provided with the upwardly-extended body portions $h^3$, which in turn have the lateral extensions $h^2$ and a centrally-disposed opening arranged transverse to the bearing for the shaft G. The manner of coupling the boxings to the frame part B is very simple and is such as to enable the same to have a swinging or pivotal relation thereto. The frame B is provided with a bearing $h$ for the boxing H, which has the pocket B', in which the extension $h^3$ of the boxing H is seated, and $h'$ is a suitable spindle or bolt carried through the bearing $h$ and the boxing H through the extension $h^3$ for retaining the same in bearing relation with the frame B and on which the same is permitted to swing.

At the inner ends of the shaft G, I have provided a novel coupling or bearing for the same which will permit of a vertical adjustment of the shaft, which consists of the half-boxings $g$, having the hollowed-out portions $g'$ and suitably arranged to be carried in the rectangular opening $D'$ of the frame D, so as to have a sliding relation therein. On the inner ends of the shaft G are shown suitable collars or bearings J, journaled in the boxings $g$ and provided with inner matching convex ends arranged to be carried in the hollowed-out portions $g'$ of the same, which may be arranged to have a suitable lubricant admitted thereto, so as to keep them well lubricated. The inner matching ends of the shaft G have flattened portions $g^2$, matching flattened portions of the bearings, arranged in such a manner as to have the bearings J roll with the shaft rather than to have the shaft roll in its boxings.

Interposed between the centrally-disposed bearings and the boxings H of the frames B, I have shown suitable pulverizing-wheels C, which may be of any preferred construction, carried by the shaft G at suitable distances apart, and I represents suitable sand boxings or collars interposed on the shaft between the wheels having suitable flange portions or extensions $i$, arranged to overlap the hubs of the wheels C to prevent any sand or dirt from getting onto the shaft G, which would tend to wear out the bearings and prevent the easy rotation of the wheels as is now the case where a sand ring or collar such as I have shown is used.

The pulverizer may have a suitable seat supported by the seat-post F, carried on the frame, and have the usual tongue or pole, (shown at E,) supported in any suitable manner from the frame.

Having thus fully described my invention, what I claim, and desire to secure by Letters Patent of the United States, is—

1. In a pulverizer, the combination with a supporting-frame, of a shaft journaled therein and having a plurality of pulverizing-wheels mounted and turnable therewith, swinging boxings for the outer end of the shaft journaled in hollowed-out bearings suitably formed in the frame, substantially as described.

2. In a pulverizer, the combination with a supporting-frame, a shaft substantially of two parts suitably journaled in the frame, the matching inner ends of the shaft carried in collars J, having matching convex faces, and journaled in a boxing capable of vertical adjustment in the supporting-frame, the outer end of the shaft-sections journaled in swinging boxings to permit of the vertical adjustment of the inner ends.

3. A pulverizer, consisting of a supporting-frame, a shaft consisting of two parts flexibly journaled in said frame, a plurality of pulverizing-wheels mounted and turnable with said shaft, a centrally-disposed frame part having means whereby the inner ends of said shaft may be suitably journaled for vertical adjustment therein, substantially as described.

4. In a pulverizer, a shaft consisting of two parts, a universal bearing for the inner ends thereof comprising two half-boxings arranged for vertical adjustment and having centrally-disposed hollowed-out portions, bearings for the inner matching ends of the shaft rotatable therewith and suitably journaled to rotate in said boxings, swinging supports at the opposite or outer ends of the shaft to permit a vertical adjustment of the inner ends thereof, substantially in the manner, and for the purpose set forth.

5. In a pulverizer, the combination with a supporting-frame having the outer oppositely-arranged bearings $h$, and the centrally-disposed bearing D, of a two-part shaft carrying suitable pulverizers and flexibly journaled in the bearings of said frame, boxings H, for the outer end of the shaft-sections and the half-boxings $g$, for the inner matching ends of the shaft capable of vertical adjustment in the bearing D, substantially as described.

6. In a pulverizer, the combination with a supporting-frame having the outer bearings $h$, a plurality of pulverizing-wheels mounted on a shaft flexibly carried in the frame, and composed of sections having inner matching ends, outer boxings H, having extensions $h^3$, and spindles $h'$, and journaled to have a swinging movement in the bearings $h$, through the spindles $h'$, half-boxings $g$, inclosing the inner matching ends of the shaft-sections and capable of vertical adjustment in the frame, and sand-boxings I, interposed on the shaft between the pulverizing-wheels, substantially as described.

In testimony whereof I affix my signature in presence of two witnesses.

CHARLES H. DUISDIEKER.

Witnesses:
CORA F. WEIMER,
CHAS. W. LA PORTE.